United States Patent
Traub et al.

(10) Patent No.: US 7,814,497 B2
(45) Date of Patent: Oct. 12, 2010

(54) COMPUTER APPLICATION INTERFACE TO RADIO-FREQUENCY IDENTIFICATION DATA

(75) Inventors: Kenneth R. Traub, Lexington, MA (US); Steven F. Rehling, Cincinnati, OH (US)

(73) Assignee: Bea Systems, Inc., San Jose, CA (US)

( * ) Notice: Subject to any disclaimer, the term of this patent is extended or adjusted under 35 U.S.C. 154(b) by 1563 days.

(21) Appl. No.: 10/883,850

(22) Filed: Jul. 6, 2004

(65) Prior Publication Data

US 2009/0085723 A1 Apr. 2, 2009

Related U.S. Application Data

(60) Provisional application No. 60/553,968, filed on Mar. 18, 2004.

(51) Int. Cl.
*G06F 9/44* (2006.01)
*G08B 13/14* (2006.01)

(52) U.S. Cl. .................... 719/310; 340/572.1

(58) Field of Classification Search .......... 340/572.1, 340/825.49
See application file for complete search history.

(56) References Cited

U.S. PATENT DOCUMENTS

| | | | |
|---|---|---|---|
| 5,942,987 A | 8/1999 | Heinrich et al. | |
| 6,286,762 B1 | 9/2001 | Reynolds et al. | |
| 6,384,712 B1 | 5/2002 | Goldman et al. | |
| 7,290,708 B2 * | 11/2007 | Haller | 235/385 |
| 7,345,585 B2 * | 3/2008 | Singhal et al. | 340/572.1 |
| 2002/0008140 A1 | 1/2002 | Reynolds et al. | |
| 2002/0158765 A1 * | 10/2002 | Pape et al. | 340/573.3 |
| 2003/0227392 A1 * | 12/2003 | Ebert et al. | 340/825.49 |
| 2004/0015418 A1 * | 1/2004 | Dooley et al. | 705/28 |

OTHER PUBLICATIONS

John Price, Ed Jones, Howard Kaupstein, Ravi Pappu, Darrell Pinson, Richard Swan and Ken Traub, "Auto-ID Reader Protocol 1.0," Working Draft Version of Sep. 5, 2003, pp. 1-46.*

* cited by examiner

*Primary Examiner*—Li B Zhen
(74) *Attorney, Agent, or Firm*—Squire, Sanders & Dempsey, LLP

(57) ABSTRACT

An interface to radio-frequency identification (RFID) data provides RFID data in response to an event cycle specification received from an application. The interface is configured to receive the event cycle specification that identifies one or more RFID sources. The event cycle specification also includes a boundary specification that defines a boundary for an event cycle and a report specification that defines a requested output of a non-redundant RFID data. The interface to RFID data, in response to receiving the event cycle specification, provides an output of non-redundant RFID data conforming to the event cycle specification.

66 Claims, 6 Drawing Sheets

COMPUTER APPLICATION INTERFACE TO RADIO-FREQUENCY IDENTIFICATION DATA

CROSS REFERENCE TO RELATED APPLICATIONS

This application claims the benefit of U.S. Provisional Application No. 60/553,968, filed Mar. 18, 2004, and titled "A Computer Application Interface to Radio-Frequency Identification Data," which is incorporated by reference in its entirety.

TECHNICAL FIELD

This description relates to a computer interface to radio-frequency identification (RFID) data.

BACKGROUND

Products, vehicles and other types of physical items may be uniquely identified by radio frequency identification (RFID) techniques. A particular item, or collection of items, is identified by means of a RFID tag having a unique identifier. One example of a RFID tag is a transponder that includes an integrated circuit containing a power source and radio frequency circuitry to transmit a radio frequency signal having a unique identifier associated with the tag. A RFID reader device, which generally has an antenna and a transceiver, detects and processes the radio frequency signal produced by a RFID tag when the RFID tag is within the range of the RFID reader device. The unique identifier of the RFID tag may be transmitted from the RFID reader device to a computer for use by an application program.

SUMMARY

In one general aspect, an interface to RFID data provides RFID data in response to an event cycle specification received from an application. The interface is configured to receive the event cycle specification that identifies: (i) one or more RFID sources; (ii) a boundary specification that defines a boundary for an event cycle; and (iii) a report specification that defines a requested output of non-redundant RFID data. The interface to RFID data, in response to receiving the event cycle specification, provides an output of non-redundant RFID data conforming to the event cycle specification.

Implementations may include one or more of the following features. For example, the interface to RFID data may receive, from a second application program, a second event cycle specification that identifies one or more RFID sources, a boundary specification defining a boundary for an event cycle, and a report specification defining a requested output of a non-redundant RFID data. The interface to RFID data, in response to receiving the second event cycle specification, may provide a second output of non-redundant RFID data conforming to the second event cycle specification.

Some of the RFID sources of the event cycle specification may be the same as some of the RFID sources of the second event cycle specification. All of the RFID sources of the event cycle specification may be the same as all of the RFID sources of the second event cycle specification. All of the RFID sources of the event cycle specification may be different from all of the RFID sources of the second event cycle specification.

The event cycle specification and the second event cycle specification may be received substantially concurrently. The output of non-redundant RFID data conforming to the event cycle specification and the second output of non-redundant RFID data conforming to the second event cycle specification may be produced substantially concurrently. The event cycle specification may be received substantially concurrently with the provision of the second output of non-redundant RFID data conforming to the second event cycle specification.

An RFID source may include one or more RFID physical readers or one or more antennas. Each antenna may be associated with a physical RFID reader. An RFID source also may be a logical reader that is associated with one or more RFID physical readers or one or more antennas.

An event cycle specification may include a read cycle specification that defines a rate of a read cycle performed by each of the RFID readers identified in the event cycle specification. The rate of the read cycle may be a time value that defines time between a start of one read cycle and a start of a next read cycle in a series of read cycles. The rate of the read cycle may include a Boolean value that identifies whether the time value or a previously configured rate of a read cycle is used to define the rate of the read cycle performed by each of the RFID readers identified in the event cycle specification.

The boundary specification may include an indication of a trigger event to initiate a start of an event cycle. The indication of the trigger event may be a uniform resource identifier. The boundary specification also may be a repetition time value that defines an interval of time used to initiate a subsequent event cycle based on passage of the interval of time since the start of a previous event cycle or a duration time value that defines an interval of time used to determine when an event cycle ends based on passage of the interval of time since the start of the event cycle. The duration time value in a boundary specification may be expressed in an amount of time, including milliseconds. The duration time value also may include a predetermined number of read cycles.

The boundary specification may include a stable-field interval time value that defines an interval of time used to end an event cycle when no new RFID tag identities are read within the interval of time. The stable-field interval time value may be a duration time value expressed in milliseconds or another amount of time. The stable-field interval time value may include a predetermined number of read cycles or an indication of a stop-trigger event to end an event cycle. The indication of the stop-trigger event may be a uniform resource identifier.

When the boundary specification includes a stable-field interval time value, a duration time value and a stop-trigger event, interface to RFID data may be configured to end an event cycle based on the first occurrence of detection of a stop-trigger event, passage of the duration time value, or passage of the stable-field interval of time value.

The interface to RFID data may receive a name used to reference the event cycle specification. The interface also may receive a request from the application program that identifies a particular event cycle specification name and a destination to which non-redundant RFID data is to be provided. If so, the interface provides the output of non-redundant RFID to the destination based on the particular event cycle specification name received. Outputs may be provided in response to receiving a request or on a recurring basis based on receiving the request from the application program without receiving subsequent requests from the application program.

The report specification may include a report set specification that indicates whether the output of non-redundant RFID data is to include all RFID tag identities in the current event cycle, only RFID tag identities added since the previous event cycle, or only RFID tag identities deleted since the previous event cycle. The report specification also may include a report set specification that indicates a filter specification that identifies search criteria to identify RFID tag identities to be processed to produce the output. The filter specification may include an RFID tag identity pattern that defines a numeric range of RFID tag identities. The filter specification also may identify whether RFID tag identities are to be included in, or excluded from, the output.

The report specification may include a report type specification that indicates whether the output is to include a list of RFID tag identities, a count of RFID tag identities, a group membership report that identifies RFID tag identities that are included in a particular group of RFID tag identities, or a group cardinality report that provides a count of RFID identities that are included in a particular group of RFID tag identities. The report specification also may include a Boolean value that indicates whether an indication is to be provided to the application program when no RFID identities conform to the report specification.

The event cycle specification may identify a second report specification defining a requested output of non-redundant RFID data.

The interface to RFID data also may provide, based on access control information associated with the application program, only outputs that are permitted to be provided to the application program.

The access control information may identify permitted access to RFID data from one or more RFID sources. The access control information may identify permitted access to RFID data by specifying search criteria to identify RFID data that are permitted to be accessed. The search criteria may include a RFID tag identity pattern that defines a numeric range of RFID tag identities.

Providing the output of non-redundant RFID data may include providing an event cycle report having a header identifying the event cycle and a report body having an output of non-redundant RFID data. The header may be an integer denoting the length of the time from the beginning of the event cycle to the end of the event cycle, an integer denoting the number of read cycles completed during the event cycle, a termination condition that indicates a condition that caused the event cycle to end, and the RFID sources from which read cycle data was aggregated to produce event cycle data of the event cycle.

The report body may include an integer denoting the number of RFID tag identities aggregated during the event cycle or a list of RFID tag identities aggregated during the event cycle. The report body also may include a group cardinality report body that includes a list of pairs with each pair including a group name and an integer denoting the number of RFID tag identities that are included in a group identified by the group name. The report body also may include a group member report body that includes a list of pairs with each pair including a group name and a list of RFID tag identities that are included in a group identified by the group name.

Implementations of the techniques discussed above may include a method or process, a system or apparatus, or computer software on a computer-accessible medium.

The details of one or more of the implementations are set forth in the accompanying drawings and description below.

Other features will be apparent from the description and drawings, and from the claims.

DESCRIPTION OF DRAWINGS

Like reference symbols in the various drawings indicate like elements.

DETAILED DESCRIPTION

Figure 1:
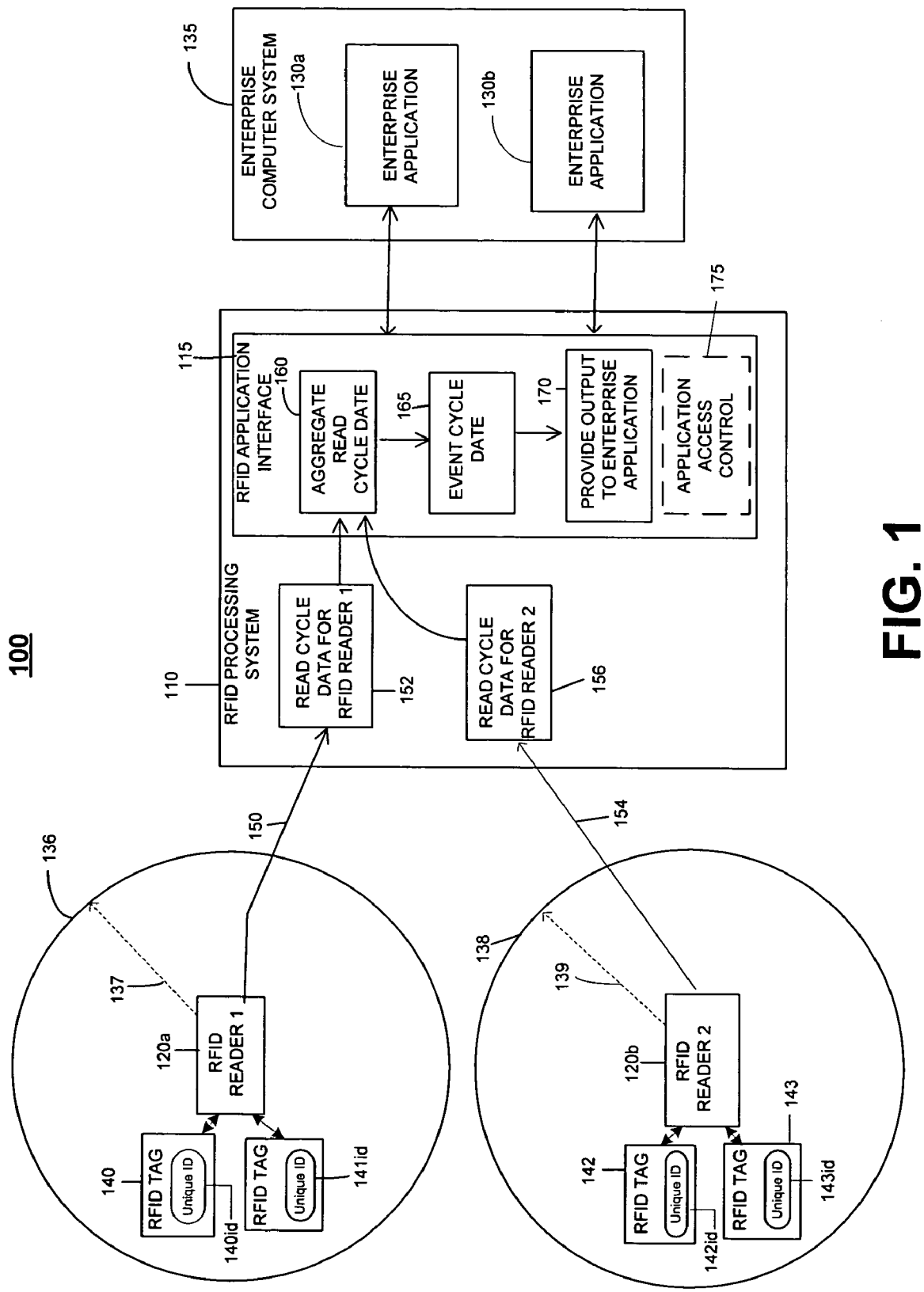
FIG. 1 is a block diagram of a system that implements a computer interface to an application program for use in providing the application program with RFID data.

Referring to FIG. 1, a system 100 includes a RFID processing system 110 having a RFID application interface 115 that processes RFID data received from RFID readers 120$a$ and 120$b$. The RFID application interface 115 provides the processed RFID data to enterprise applications 130$a$ and 130$b$ that operate on an enterprise computer system 135. In particular, the RFID application interface 115 aggregates the RFID reader data and provides outputs to each of the enterprise applications 130$a$ and 130$b$. As such, the RFID application interface 115 is able to support particular data needs of each of the requesting enterprise applications 130$a$ and 130$b$.

More particularly, the RFID reader 120$a$ has a range boundary 136 defined by a range that is depicted by an arrow 137. The RFID reader 120$a$ is capable of detecting and receiving the unique identifiers of any tag within the range boundary 136. In some implementations, the RFID reader 120$a$ may have more than one antenna for concurrent detection and receipt of unique identifiers of tags. Additionally or alternatively, when the RFID reader 120$a$ has more than one antenna, each antenna may be used for separate detection and receipt of unique identifiers of tags within a separate range boundary associated with each antenna. The separate use of each antenna may be in addition to, or in lieu of, concurrent use of an antenna with another antenna. The RFID reader 120$b$ has similar functionality within a range boundary 138 that is defined by a range that is depicted by an arrow 139 and may include more than one antenna for concurrent or separate detection and receipt of unique identifiers of tags. Thus, the RFID reader 120$a$ detects and receives the unique identifier 140$id$ of tag 140 and the unique identifier 141$id$ of tag 141 because each of the tags 140 and 141 is within the range of the RFID reader 120$a$. Similarly, the RFID reader 120$b$ detects and receives the unique identifier 142$id$ of tag 142 and the unique identifier 143$id$ of tag 143 because each of the tags 142 and 143 is within the range of the RFID reader 120$b$.

Any or all of the unique identifiers 140$id$-143$id$ may be an electronic product code ("EPC") that is used to uniquely identify a product associated with the RFID tag. In certain implementations, an EPC includes a manufacturer identifier, a product identifier, and a unique serial number for a particular product. In the description appearing below, the term EPC is used to refer to a tag identity in general and is not limited to the specific implementation in which an EPC includes a manufacturer identifier, a product identifier, and a unique serial number for a particular product.

Any or all of the tags 140-143 may be an active RFID tag that includes a power source, such as a battery, for generating a signal for transmitting the tag's unique identifier. Additionally or alternatively, any or all of the tags 140-143 may be a passive RFID tag that does not include a power source. In contrast with an active tag, a passive tag is able to capture power from a signal generated by a RFID reader and use that power to generate a signal having the unique identifier of the tag, which is subsequently read by the RFID reader.

Any or all of the tags 140-143 and the readers 120a and 120b may be proprietary to a particular manufacturer or vendor. In fact, the reader 120a and the tags 140 and 141 may be proprietary to one manufacturer, whereas the reader 120b and the tags 142 and 143 may be proprietary to a different manufacturer. In some implementations, some or all of the readers 120a and 120b and tags 140-143 may conform to an open system standard for interoperability of RFID systems.

A RFID reader may be referred to more simply as a "reader," and a RFID tag may be referred to as a "tag." The detection and receipt of a unique identifier of a tag may be referred to as "reading a tag." This terminology is used in the discussion below.

The reader 120a transmits the unique identifiers 140*id* and 141*id* to the RFID processing system 110, as indicated by data flow 150. The data may be transmitted over a wired or wireless network, though other types of data communication channels may be used in addition to, or in lieu of, a network.

More particularly, because tags may move into and out of the range of the reader 120a, the reader 120a periodically transmits the unique identifiers of tags read since the last transmission of unique identifiers to the RFID processing system 110. Each transmission of unique identifiers from the reader 120a to the RFID processing system 110 may be referred to as a read cycle, which is the smallest unit of interaction between the reader 120a and the RFID processing system 110. In general, a read cycle provides a set of unique identifiers read from tags during one or more operations of the radio frequency protocol of the reader 120a. The reader 120a includes a mechanism in its radio frequency protocol to ensure that each tag that is in range is read at most once during a read cycle. In some implementations, the reader 120a may not include such a mechanism to eliminate redundant unique identifiers from tags read multiple times during a read cycle. In such a case, the RFID processing system 110 eliminates duplicate instances of identifiers from the data for a read cycle. The RFID processing system 110 also eliminates duplicate instances of identifiers that arise when the same tag falls within the range boundary of more than one reader at the same time.

The RFID processing system 110 receives and stores the unique identifiers 140*id* and 141*id* in a read cycle data store 152, which may be transient or persistent storage. In one example, the RFID processing system 110 stores the unique identifiers 140*id* and 141*id* in random access memory. In another example, the RFID processing system 110 stores the unique identifiers 140*id* and 141*id* in a storage medium (e.g., magnetic, optical or solid state storage media) on a data storage device that may be internal or external to the RFID processing system 110.

Similarly, the reader 120b transmits the unique identifiers 142*id* and 143*id* to the RFID processing system 110, as indicated by data flow 154. The RFID processing system 110 receives and stores the unique identifiers 142*id* and 143*id* in a read cycle data store 156.

The RFID application interface 115 of the RFID processing system 110 includes a process 160 for aggregating data from the data stores 152 and/or 156—that is, the unique identifiers that are received from one or both of the readers 120a and 120b. The aggregated data 165 that results from process 160 may be referred to as event cycle data 165. Typically, though not necessarily, the event cycle data 165 includes unique identifiers from multiple read cycles. Because the same tag may be read several times when the tag remains within the reader's range over multiple read cycles of the reader, the aggregation process 160 eliminates duplicate unique identifiers so that only one instance of each detected identifier is included in the event cycle data. Likewise, if the same tag is read by more than one reader during the event cycle, the aggregation process 160 eliminates duplicate identifiers. Thus, the event cycle data 160 includes a non-redundant list of unique identifiers aggregated from read cycle data stores 152 and/or 156.

More particularly, an event cycle is one or more read cycles that are to be treated as a unit by an application. Thus, the application need not receive the read cycle data and perform the aggregation of the read data itself. Instead, an application is able to work with aggregated RFID data based on the needs of the application. In other words, an event cycle is the smallest unit of interaction between the RFID application interface 115 and an enterprise application 130a or 130b. The enterprise application 130a or 130b is shielded from dealing with the raw read data. Generally, though not necessarily, one application uses an event cycle that differs from the event cycle for another application. By way of example only, an event cycle may be defined based on a particular quantity of read cycles (such as, for example, when an event cycle is defined as including the unique identifiers of tags read during each single read cycle, during every two read cycles, or during every twenty read cycles). An event cycle also may be defined as occurring periodically (such as, for example, when an event cycle is defined to include unique identifiers that are within range of a reader every n minutes independent of when a read cycle of the reader begins or ends). An event cycle also may be delimited by an external event, such as an event cycle that starts when a pallet on a conveyer triggers an electric eye upstream of a portal and ends when the pallet crosses a second electric eye downstream of the portal. An event cycle may be defined as ending when a set of unique identifiers within a reader's range remains constant for a specific number of read cycles or interval of real time.

Thus, the RFID processing system 110, and more particularly the RFID application interface 115, is able to aggregate the reader data based on the data needs of one or both of the enterprise applications 130a and 130b. The same reader data is able to be used for different purposes in each of the enterprise applications 130a and 130b. Each of the enterprise applications 130a and 130b is able to receive data that is aggregated from more than one reader and/or more than one antenna of a reader. Moreover, each of the enterprise applications 130a and 130b is able to receive data from multiple readers independently of the multiple readers from which the other of the enterprise application 130a or 130b receives data. The enterprise application 130a and 130b may use different combinations of readers, including combinations of readers and antennas that are completely disjoint, partially overlapping, or the same as compared with the combinations of readers and antennas used by the other of the enterprise applications 130a or 130b.

The RFID application interface 115 is capable of receiving a request for RFID data from one of the enterprise applications 130a or 130b. In response, the RFID application interface 115 uses a process 170 to provide an output to the requesting enterprise application 130a or 130b. The output by the RFID application interface 115 provided is based on the event cycle data 165 aggregated from the read cycle data stores 152 and/or 156. The output may be referred to as a report.

The RFID application interface 115 is capable of providing different kinds of reports of RFID data. By way of example only, the RFID application interface 115 is capable of providing a count of the number of unique identifiers in the event cycle data for the application making the request, a list of the particular unique identifiers in the event cycle data for the application, and counts of the numbers of unique identifiers that fall within different groups. Alternatively or additionally, the RFID application interface 115 is able to provide RFID data based on data from a single event cycle of an application or based on a comparison of data from two event cycles for an application. In one example, the RFID application interface 115 is able to provide the RFID identifiers that have been added in an event cycle that is subsequent to a previous event cycle. In another example, the RFID application interface 115 is able to provide the RFID identifiers that have been deleted. Alternatively or additionally, the RFID application interface 115 is able to provide filtered event cycle data based on search criteria included in the request.

As illustrated in the FIG. 1, the RFID application interface 115 permits substantially simultaneous or concurrent requests from multiple, independent enterprise applications (here, enterprise applications 130a and 130b) for RFID data.

The RFID application interface 115 also is able to accept an input from an enterprise application to define an event cycle and one or more reports to be used by the enterprise application. In some implementations, an application is able to specify event cycle parameters to define an event cycle—that is, how read cycle data is to be aggregated—when requesting a report. Alternatively or additionally, event cycle and report parameters for a particular application may be received by the RFID application interface 115 prior to, and separate from, the delivery of reports by the RFID application interface 115 to the enterprise application.

In some implementations, an application may specify event cycle and report parameters at the time the application initiates an event cycle. This may be referred to as a pull mode. In contrast, event cycle and report parameters also may be set by an application registering a recurring subscription to event cycles. This may be referred to as a subscription mode or a push mode. In subscription mode, the application to which reports are delivered may be the same application or a different application than the application which registers the recurring subscription. In one example, a warehouse application may register a recurring subscription to one or more reports and request the provision of some or all of the requested reports to a database application that is different from the warehouse application that makes the request for the one or more reports.

In some implementations, the RFID application interface 115 includes a process 175 to provide access control over the outputs that may be provided to each of enterprise applications 130a and 130b. The process 175 limits the outputs provided, regardless of requests made by the enterprise application 130a or 130b. In one implementation, the process 175 filters the output 170 before the output is provided to one of the enterprise applications 130a or 130b. Alternatively or additionally, the process 175 filters the requests received from enterprise application 130a or 130b before aggregating read cycle data to create event cycle data. In any case, the process 175 controls application access to event cycle data to permit access to only a portion of data, independent of the definition of an event cycle provided by the application or a request for event cycle data made by the application.

The RFID application interface may control application access based on filter or search criteria to identify RFID data that are permitted to be accessed. This may include, for example, controlling access to read cycle data based on the source of the data (that is—the readers and/or antennas from which the data originated). Access also may be controlled based on tags read. For example, access may only be permitted to read cycle data that includes tags associated with a particular manufacturer or manufacturers, and/or tags associated with a particular product or products. Additionally or alternatively, controlling access to RFID data may include using search criteria to identify RFID data, with the search criteria specifying a RFID tag identity pattern that defines a numeric range of RFID tag identities.

The access control capability of the RFID application interface may be particularly useful in an electronic commerce context in which an application controlled by a supplier is permitted access to a portion of read cycle data collected and aggregated by a purchaser of the supplier's products. In one example, a chain of stores may use a RFID application interface to obtain event cycle data from various RFID readers located in different stores and warehouses for the purpose of tracking product inventory and sales. The chain of stores may allow suppliers to use a RFID application interface to directly access some, but not all, of the reader data. For example, the chain of stores may allow a particular supplier to have access to data only related to products supplied by the particular supplier. The supplier's access may be further limited to access only the supplier's products that are located in a warehouse and not to allow the supplier to access data about any products that are in stores. The RFID processing system 110 need not necessarily be implemented as a computer system. For example, the RFID processing system 110 may be implemented as a computer application that is separate from the applications that request RFID data, a computer program, module or function within an application that requests RFID data, or a software layer that is situated between an application layer and a network layer. As illustrated, the enterprise applications 130a and 130b may operate on the same computer system, though they do not need to do so. Similarly, although the applications illustrated in system 100 are enterprise applications, the RFID application interface 115 may provide data to other types of computer applications.

Figure 2:
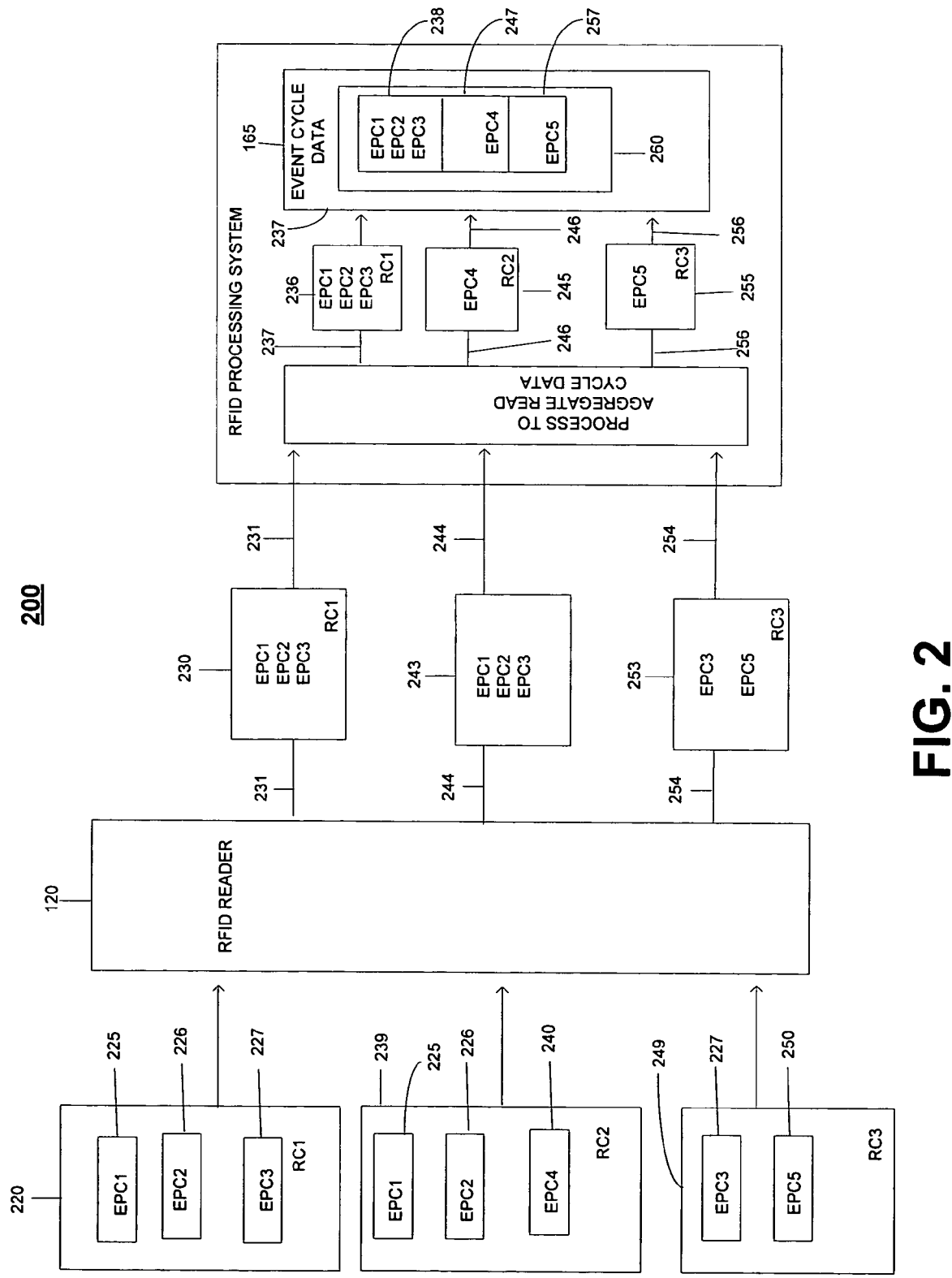
FIGS. 2 and 3 are diagrams of processes for aggregating read cycle data to create event cycle data.

FIG. 2 depicts an example process 200 of a reader 120 that separately transmits each of three read cycles of data to a RFID processing system 110 having a process 160 that aggregates the received data into event cycle data 165. For convenience, the process 200 shown in FIG. 2 references particular components described with respect to FIG. 1. However, similar methodologies may be applied to other implementations where different components are used to define the structure of the system, or where the functionality is distributed differently among the components shown by FIG. 2. For example, although FIG. 1 shows the aggregation process 160 as a component of the RFID application interface 115, the aggregation process 160 may be separate from the RFID application interface 115.

In the example process 200, the unique identifiers of tags read by the reader are EPCs and the reader 120 includes a mechanism to ensure that each tag in the range boundary detectable by the reader 120 is read at most once during any particular read cycle.

More particularly, the process 200 begins when the reader 120 reads the EPCs 220 from each of the tags 225-227 that are within the range of the reader 120 during a first read cycle ("RC1"). The reader 120 reads EPC1 from tag 225, EPC2 from tag 226 and EPC3 from tag 227. The list 230 of the EPCs from the tags 225-227 that were read during the first read cycle are transferred to the RFID processing system 110, as illustrated by data flow 231.

The RFID processing system 110 executes a process 160 to aggregate read cycle data and eliminate duplicate EPCs read during multiple read cycles, as described previously with respect to FIG. 1. In the first read cycle, because it is the first read cycle in the event cycle, there are no EPCs in event cycle data 165. Thus, the RFID processing system 110 stores all of the EPCs received from the reader 120 in the event cycle data 165, as illustrated by the list 236 and data flow 237. After the RFID processing system 110 has aggregated the EPCs read during the first read cycle, the event cycle data 165 includes EPC1, EPC2 and EPC3, as illustrated by the event cycle data 238.

During the second read cycle ("RC2"), the reader 120 reads the EPCs 239 from each of the tags 225, 226 and 240 that are within the range of the reader 120 during the second read cycle. The reader 120 reads EPC1 from tag 225, EPC2 from tag 226 and EPC4 from tag 240. The list 243 of the EPCs from the tags 225, 226 and 240 that were read during the second read cycle are transferred to the RFID processing system 110, as illustrated by data flow 244.

The RFID processing system 110 executes the aggregation process 160 to generate a list 245 of EPCs that are new—that is, not already included in the event cycle data 115. In this instance, the process 160 determines that, of the EPCs on the list 243, only EPC4 from tag 240 has not previously been read during the event cycle. Accordingly, the RFID processing system 110 includes only EPC4 in the list 245 of EPCs that is included in the event cycle data 165, as illustrated by data flow 246. After the RFID processing system 210 has aggregated the EPCs read during the second read cycle, the event cycle data 165 includes EPC1, EPC2, EPC3, and EPC4, as illustrated in the event cycle data 238 and 247.

Similarly, during the third read cycle ("RC3"), the reader 120 reads the EPCs 249 from each of the tags 227 and 250 that are present within the range of the reader 120 at some point during the third read cycle. The reader 120 reads EPC3 from tag 227 and EPC5 from tag 250. The list 253 of the EPCs from the tags 227 and 250 that were read during the third read cycle are transferred to the RFID processing system 210, as illustrated by data flow 254.

The RFID processing system 110 executes the aggregation process 160 to generate a list 253 of EPCs that are new—that is, not already included in the event cycle data 165. In this instance, the process 160 determines that, of the EPCs on the list 253, only EPC5 from tag 250 has not previously been read during the event cycle. Accordingly, the RFID processing system 110 includes only EPC5 in the list 253 of EPCs that is included in the event cycle data 165, as illustrated by data flow 256. After the RFID processing system 110 has aggregated the EPCs read during the third read cycle, the event cycle data 165 includes EPC1, EPC2, EPC3, EPC4 and EPC5, as illustrated in the event cycle data 238, 247 and 257 (collectively, event cycle data 260).

Thus, the RFID processing system 210, executing the aggregation process 160, generates event data 260 representing a list of non-redundant EPCs read during the three read cycles that comprise the event cycle. The event cycle data 165 is available for manipulation by the RFID processing system 110 to satisfy requests for RFID data by an enterprise application for which the event cycle is appropriate.

In addition, the RFID processing system may use the process 160 to aggregate read cycle data from multiple readers and/or multiple antennas, which may be associated with the same, or different, readers. To do so, an application may be able to define an event cycle based on physical devices, antennas, or logical devices (where a logical device is defined in terms of any combination of physical readers and/or antennas). A logical reader provides a level of abstraction between (1) physical readers and antennas and (2) logical constructs of readers and/or antennas used by an application. A logical reader is defined to include particular physical readers and/or antennas. This may be referred to as the configuration of the logical reader. The ability of an application to use one or more logical readers to define an event cycle may help to insulate applications from changes that occur in physical readers. For example, an application may need to process data from a particular loading dock at a warehouse and may define a logical reader to represent a logical loading dock reader that is independent of the number of physical readers or antennas used to read tags at the loading dock. To accommodate a change in the number or identity of physical readers and antennas, only the configuration of the logical reader needs to change. Thus, changes in the physical configuration of readers and antennas is transparent to the application using the event data based on the logical reader. In other words, the application itself need not be changed to reflect physical changes in readers.

Figure 3:
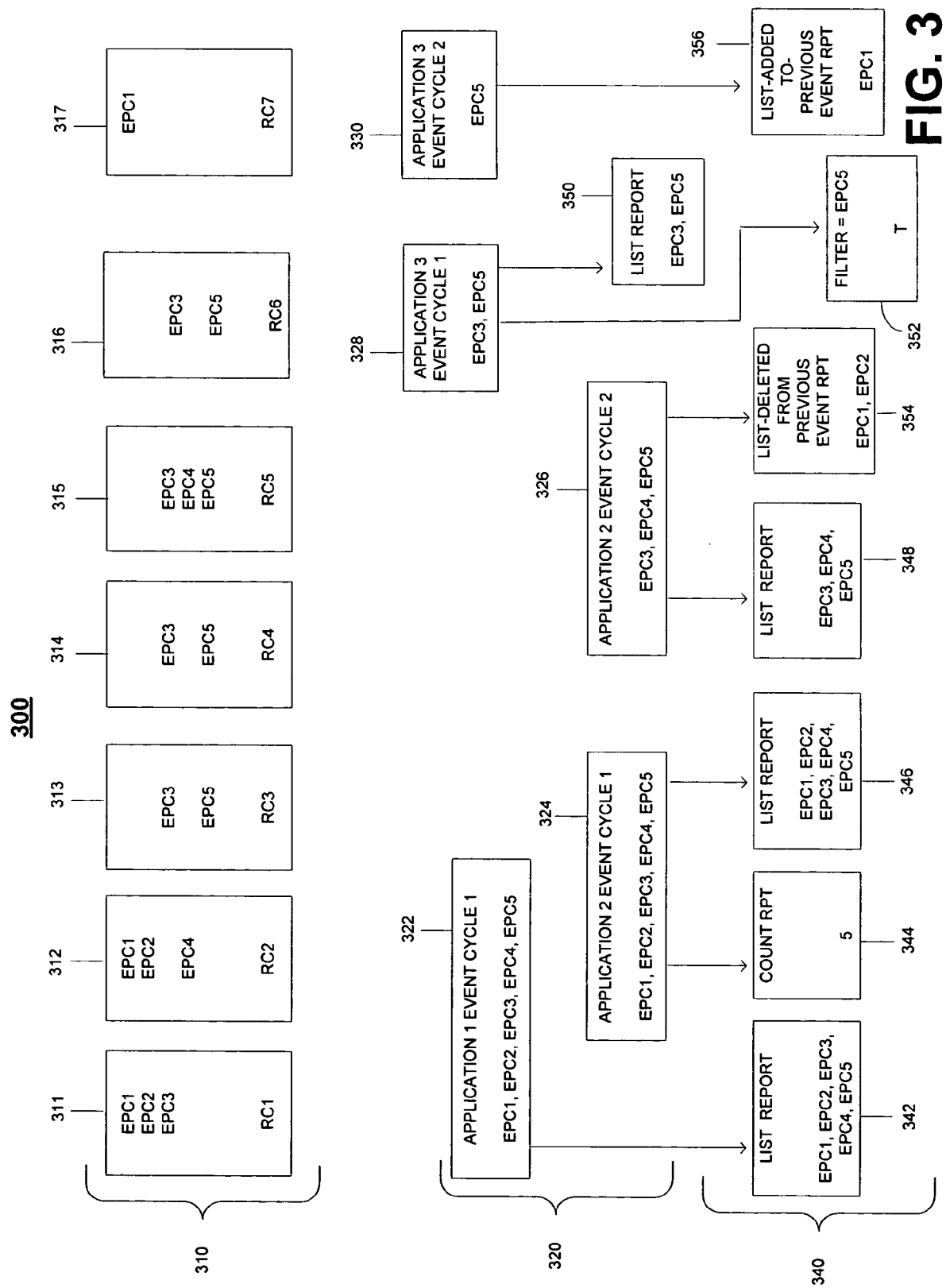

FIG. 3 illustrates examples 300 of read cycle data 310 that is aggregated, based on different definitions of event cycles by different applications, to produce event cycle data 320. The event cycle data 320, in turn, is used by an RFID application interface to produce reports 340 in response to requests by the different applications.

More particularly, the read cycle data 310 includes a non-redundant list of the EPCs read during each of read cycles 311-317 in a sequence of seven read cycles. The event cycle data 320 includes a non-redundant list 322 of the EPCs read for an event cycle defined for a first application. As shown, the first application defines an event cycle as including three read cycles (here, read cycles 311-313) that begin with the first read cycle 311 in the sequence of read cycles 311-317.

The event cycle data 320 also includes a non-redundant list 324 of the EPCs read for a first event cycle defined for a second application and another non-redundant list 326 of the EPCs read for a second event cycle for the same application. As shown, each event cycle for the second application includes two read cycles. In particular, read cycles 312 and 313 are included in the first event cycle data collection 324 for the second application and read cycles 314 and 315 are included in the second event cycle data collection 326 for the second application. In contrast with the event cycle start for the first application, the event cycles for the second application begin with the second read cycle 312 in the sequence of read cycles 311-317.

Similarly, the event cycle data 320 also show that a third application defines an event cycle of one read cycle that begins with the sixth read cycle 316 in the sequence of read cycles 311-317. Thus, the event cycle data 320 includes a non-redundant list 328 of the EPCs read for a first event occurrence of the event cycle for the third application in the sixth read cycle 316 and a non-redundant list 330 of the EPCs read for a second occurrence of the event cycle for the third application in the seventh read cycle 317.

The reports 340 may be generated by the RFID application interface based on data in a single event cycle, or on a comparison of data in two event cycles. The reports 340 also illustrate that different types of information is able to be produced by the RFID application interface. For example, a report that may be referred to as a "count report" may indicate the count of the number of EPCs included in an event cycle. In another example, a report that may be referred to as a "list report" may include a list of the particular EPCs included in an event cycle. In yet another example, a report that may be referred to as a "group cardinality report" may list groups of EPCs and counts of the number of EPCs included in an event cycle that fall into each group. Any report may also be subject to search criteria that control which EPCs are to be included in the report.

The reports 342, 344, 346, 348, 350 and 352 are reports that are based on data in a single event cycle—that is, none of the reports 342, 344, 346, 348 or 350 involve reporting on a comparison of data between two event cycles. In contrast, reports 354 and 356 are generated by comparing data in one event cycle data to data in another event cycle. In particular, the report 354 identifies the EPCs that have been deleted from the previous event cycle. The report 356 identifies EPCs that have been added since a previous event cycle.

More particularly, report 342 is generated in response to a request from the first application for a list of the EPCs in the event cycle 322. The report 344 is generated in response to a request from the second application for a count of the number of EPCs read in event cycle 322. The report 346 is generated in response to a second request from the second application for a list of the EPCs read in the same event cycle (here, event cycle 322) as report 344. The reports 348 and 354 may be generated in response to separate requests by the second application. The report 348 lists all of the EPCs in the second occurrence of an event cycle for the second application (here, event cycle data set 326). In contrast, the report 354 lists the EPCs in the first occurrence of the event cycle for the second application (here, event cycle data set 324) that are not included in the second occurrence of the event cycle for the second application (here, event cycle data set 326). Thus, the report 354 lists the EPCs that were deleted in event cycle 2.

Turning to reports 350, 352 and 356 generated for the third application, the reports 350 and 352 are generated for the first occurrence of event cycle data (here, event cycle data set 328). The report 352 is generated in response to a request from the third application as to whether a particular EPC (here, EPC5) is included in the event cycle data set 328. In contrast, report 356 for the third application shows the EPC in the second occurrence of event cycle data (here, event cycle data set 330) that was not present in the first occurrence of event cycle data (here, event cycle data set 328). Thus, the report 356 lists the EPC that was added in the event cycle 317.

As illustrated, the same read cycles 311-317 are shared by multiple event cycles 322, 324, 326, 328 and 330. In such a case, each of the event cycles 322, 324, 326, 328 and 330 need to be able to use the same read cycle frequency. The same read cycles 311-317 also are shared by different and independent applications, as shown by the event cycle 322 for a first application, the event cycle 324 for a second application, and the event cycle 328 for a third application.

The RFID application interface permits the event cycles 322, 324, 326, 328 and 330 to overlap. In one example of overlap, more than one event cycle may occur at any point in time, as shown by event cycle 322 and event cycle 324, both of which are active during read cycles 312 and 313. In another example, event cycles may start and end with different read cycles, as illustrated by event cycle 322 that begins with read cycle 311 and event cycle 328 that begins with event cycle 316. In addition, multiple event cycles may arise when one application makes several substantially simultaneous or concurrent requests. This is illustrated by event cycles 324 and 326. The event cycle 324 arises based on substantially simultaneous requests, by the second application, for reports 344 and 346, both of which are based on only event cycle 324. The event cycle 326 arises based on substantially concurrent requests, by the second application, for the report 348, which is based on event cycle 326, and the report 354, which is based on both event cycles 324 and 326.

As described previously, the event cycles for different applications may aggregate read cycle data, such as read cycle data 311-317, from one or more physical or logical readers and one or more antennas.

In one implementation of a RFID application interface, the RFID application interface receives from an application the definition of a set of readers (physical readers, antennas, and/or logical readers), a definition of an event cycle (e.g., event cycle boundaries) and a request for one or more reports of EPC data. In response, the RFID application interface returns information implied by that report specification for one or more event cycles.

The types of reports that may be requested may be described in set notation in which the set of EPC codes in a particular read cycle is denoted by S. In one example, S1={EPC1, EPC2, EPC3} and S2={EPC1, EPC2, EPC4}. Because an event cycle is treated as a unit by an application (which insulates the application from the need to understand the internal structure of the event cycle), the application need only understand that an event cycle is a complete set of EPCs occurring in any of the event cycle's read cycles, with duplicates removed. In set notation, this is the union of the read cycle sets: E=S1 U S2={EPC1, EPC2, EPC3, EPC4}.

In some implementations, an application receives information about event cycles through reports in which each report is specified by a combination of three parameters: a set to report, an optional filter to apply, and the type of information to report (which may be referred to as a "report type").

The parameter that defines which set to report specifies either (1) the complete set from the current event cycle, which may be represented as R=Ecur or (2) the differential set that only includes differences of the current event cycle relative to the previous one (assuming the same event cycle definition). The differential set may be the set of additions, which may be represented as R=(Ecur−Eprev), where − denotes the set difference operator. The differential set also may be the set of deletions, which may be represented as R=(Eprev−Ecur).

The parameter that defines an optional filter F(R) to apply may define a filter in any one of many possible ways. For example, one type of filter may be based on object types that contain embedded EPC tags. By way of example only, object types include "product" objects (e.g., pallet or case) and "location" objects (e.g. warehouse slots, trucks, or retail shelves). A filter also may be one or more EPCs or a range of EPCs. In yet another example, a filter may be based on particular readers and/or antennas.

The parameter that defines the type of information to report may be used to control, for example, whether a list report or a count report is produced. Thus, in one example, the type of information to report may be the members of the set F(R) (i.e., the EPC codes themselves) or the quantity (i.e., the cardinality) of the set |F(R)|.

The type of information to report also may be a group membership report in which a report is generated about a group of EPCs. To do so, a grouping operator in the form of a function G that maps an EPC code into a group code g is used. For example, a grouping operator might map an EPC code into the upper bits (manufacturer and product) of the EPC. Other grouping operators might be based on database data associated with each EPC, such as the object's type (e.g., pallet, case, item, warehouse slot, truck, or retail shelf). The notation S ↓g may be used to refer to a subset of EPC codes s1, s2, . . . in the set S that belong to group g. That is, S ↓g={s in S|G(s)=g}.

Using that representation, a group membership report for grouping operator G is a set of pairs, where the first element in each pair is a group name g, and the second element is a list of EPCs that fall into that group. A group membership report for a specified grouping operator G may be specified in set notation as {(g, F(R) ↓g)|F(R) ↓g is non-empty}.

In another example of the type of information that may be reported, one type of report may be a group cardinality report. In contrast to a group membership report in which the EPCs in a group are enumerated, a group cardinality report identifies the number of EPCs in each group. In other words, the group cardinality report for grouping operator G is a set of pairs, where the first element in each pair is a group name g, and the second element is the number of EPCs that fall into that group. Thus, a group cardinality report for a specified grouping operator G may be specified in set notation as: {(g, |F(R) ↓g|)|F(R) ↓g is non-empty}.

Figure 4:
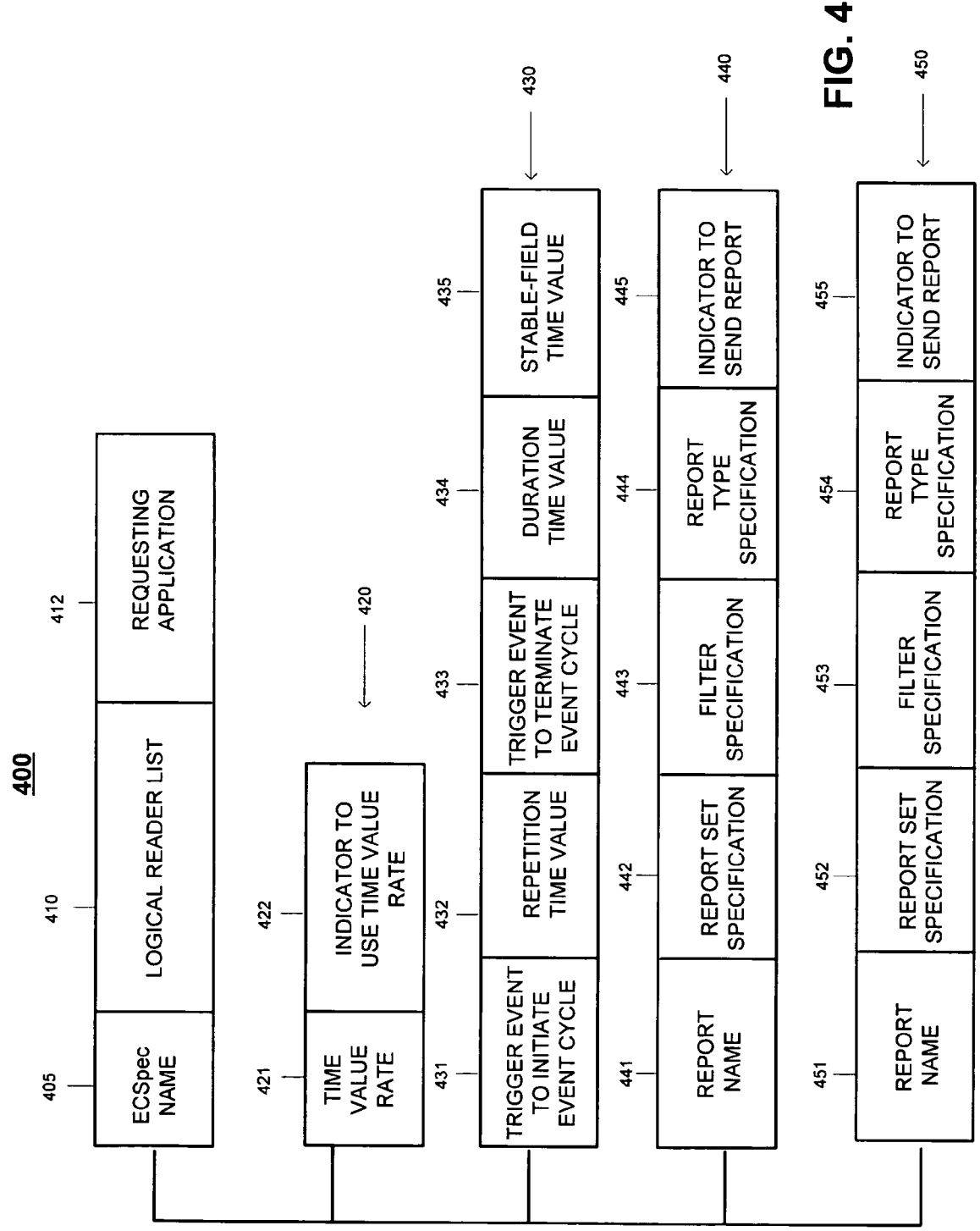
FIGS. 4 and 5 are example data structures for use by an application in defining event cycles and reports based on event cycle data.

In one implementation of an RFID application interface, an application may describe a series of event cycles and associated reports by means of a data structure called Event Cycle Specification (ECSpec). FIG. 4 illustrates one possible implementation of an ECSpec 400.

The ECSpec 400 includes a name 405 or other type of identifier to identify the particular ECSpec and a list 410 of logical readers from which to aggregate RFID data. The ECSpec 400 also includes an identifier 412 of the application that sent the request to the RFID application interface, though certain implementations may not make use of such an identifier.

The ECSpec may also include a read cycle specification 420 that defines the rate at which the RFID readers implied by the list 410 of logical readers should carry out read cycles. The read cycle specification may include an explicit time value 421 (for example, a specific number of milliseconds) that specifies the time between the start of one read cycle and the start of the next read cycle. The read cycle specification may also include a Boolean value 422 that specifies whether the time value rate 421 should be used, or whether the rate should be ignored in favor of a rate that has been previously configured.

The ECSpec may include a boundary specification 430 that defines the boundaries of event cycles. The boundary specification 430 may include a specification 431 of an external trigger event that is to be used to initiate an event cycle. The trigger specification 431 may be in the form of a Uniform Resource Identifier (URI). The boundary specification 430 may also include a specification 432 of a repetition time value (for example, a specific number of milliseconds) at which successive event cycles will be initiated in the absence of an external trigger. The boundary specification 430 may include a trigger specification 433 of an external trigger event that is to be used to terminate an event cycle. The trigger specification 433 may be in the form of a Uniform Resource Identifier (URI). The trigger specification 433 also may be referred to as a stop trigger 433. The boundary specification 430 may also include a specification 434 of a duration time value that specifies how long after the start of the event cycle the event cycle should end. The duration time value 434 may be a real time value (for example, a specific number of milliseconds) or a specified number of read cycles. The boundary specification 430 may also include a specification 435 of a stable-field interval time value that specifies that the event cycle should be terminated if no new tag identities are read within the specified interval of time. The stable field interval time value 435 may be a real time value (for example, a specific number of milliseconds) or a specified number of read cycles. The boundary specification 430 may include more than one of the stop trigger 433, the duration time value 434, and the stable-field interval 435, in which case the event cycle may be terminated when the first of those conditions occurs.

The ECSpec may include one or more report specifications. The figure shows two such report specifications 440 and 450. A report specification 440 may include a report name 441, which may be a character string. A report specification may also include a report set specification 442, which may indicate that the report should include all tag identities from the current event cycle, only tag identities that have been added since the last event cycle, or only tag identities that have been deleted since the last event cycle. A report specification may also include a filter specification 443 that specifies what tag identities are to be considered for inclusion in the report. The filter specification 443 may be specified using tag identity patterns that specify matching tag identities using numeric ranges. Such patterns may more particularly be represented as Uniform Resource Identifiers (URIs). The filter specification 443 may consist of zero or more patterns 443i that specify that matching tag identities are to be included in the report, and/or one or more patterns 443e that specify that matching tag identities are to be excluded from the report. A report specification 440 may also include a report type specification 444 that specifies whether the report should be in the form of a list of tag identities, a count of unique tag identities, a group membership report as described above, or a group cardinality report as described above. A report specification 440 may also include a Boolean value 445 that indicates whether a report should be sent to the requesting application for an event cycle in the case where there are no tag identities to report in that event cycle. Similarly, the report specification 450 may include a report name 451, a report set specification 452, a filter specification 443, a report type specification 454 and a Boolean value 455 that indicates whether a report should be sent to the requesting application even when no tag identities are reported in the event cycle.

In one implementation of an RFID application interface, the RFID application interface receives an ECSpec as described above from an application, along with a unique name by which the application will refer to the ECSpec. Subsequently, the application may request that the RFID application interface carry out one event cycle according to the ECSpec, and send the corresponding reports to the application when the event cycle completes. Alternatively, the application may request that the RFID application interface maintain a standing subscription to the ECSpec, such that the RFID application interface will deliver reports from successive event cycles to the requesting application without the application making further requests. In such a case, the application may subsequently cancel its standing subscription to a specific ECSpec. In yet another alternative, the RFID application interface may receive a request from the application that includes an ECSpec that the RFID application interface uses to immediately carry out one event cycle and send the corresponding reports to the application when the event cycle completes.

Figure 5:
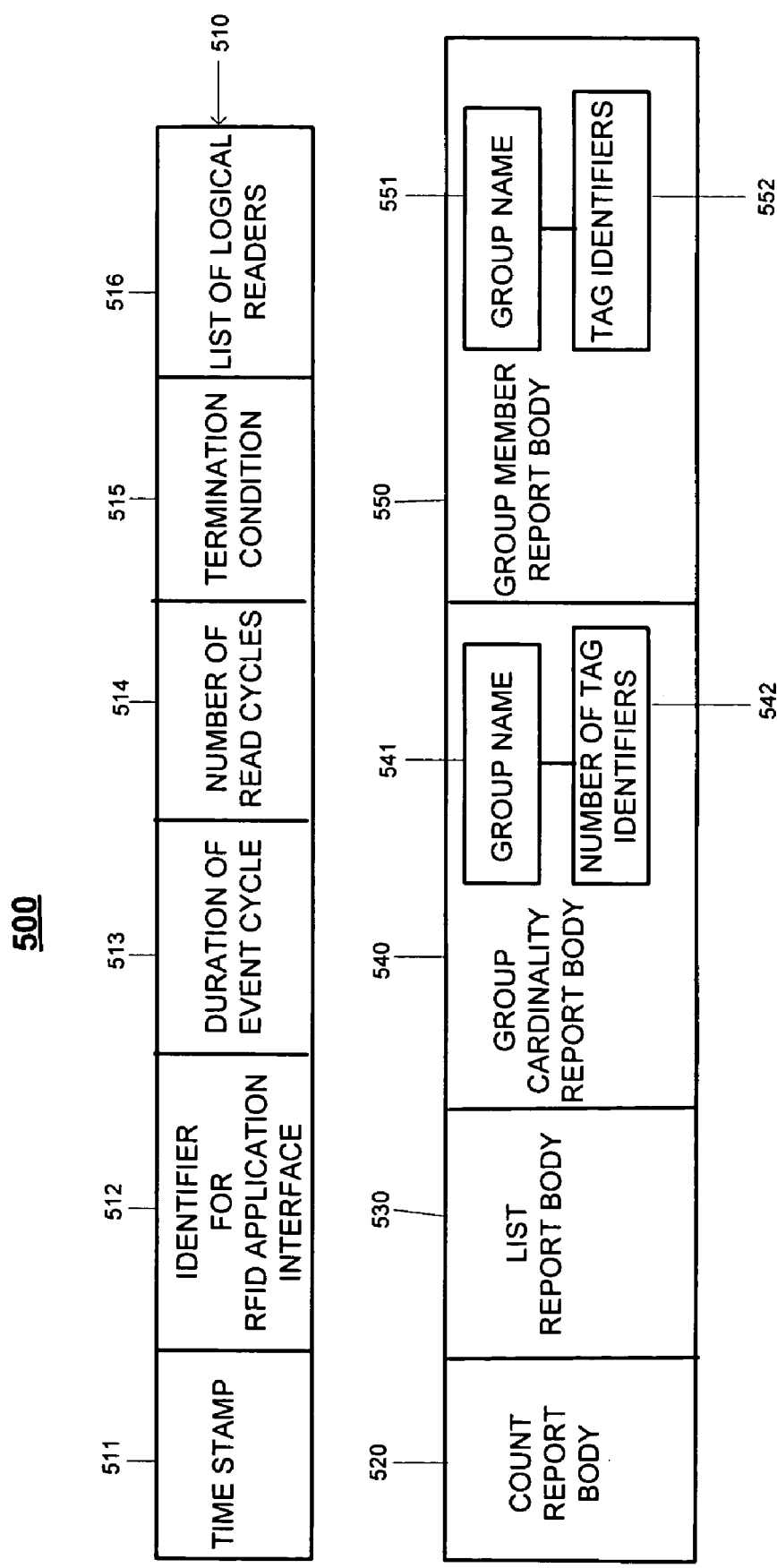

When the RFID application interface sends event cycle reports to the application, it may do so using a data structure called an Event Cycle Reports (ECReports). FIG. 5 illustrates one possible implementation of an ECReports 500.

An ECReports 500 may include a header 510 that provides information about the event cycle that produced the ECReports. The header 510 may include a timestamp 511 and an identifier 512 for the RFID application interface to identify a particular instance of an RFID application interface. The identifier 512 may be particularly useful when the RFID application interface is implemented in an environment that deploys multiple instances of RFID application interfaces. The header 510 also may include an integer 513 denoting the length of time from the beginning of the event cycle to the end of the event cycle. The integer 513 may be referred to as the duration of the event cycle. The header 510 also may include an integer 514 denoting the total number of read cycles completed during the event cycle, a termination condition 515 that indicates what condition caused the event cycle to terminate, and a list 516 of readers whose read cycles were aggregated into the event cycle.

An ECReports 500 may also include one or more report bodies. A report body may be a count report body 520 having an integer denoting the number of unique tag identities aggregated during the event cycle. A report body may also be a list report body 530 having EPC codes read from tags during the event cycle. Each such EPC code may be represented as a Uniform Resource Identifier (URI). A report body may also be a group cardinality report body 540 having a list of pairs, where each pair consists of a group name 541 and an integer 542 denoting the number of EPCs belonging to the group identified by the group name 541. A report body may also be a group membership body 550 having a list of pairs, where each pair consists of a group name 551 and a list of EPCs belonging to the group identified by the group name 551.

Figure 6:
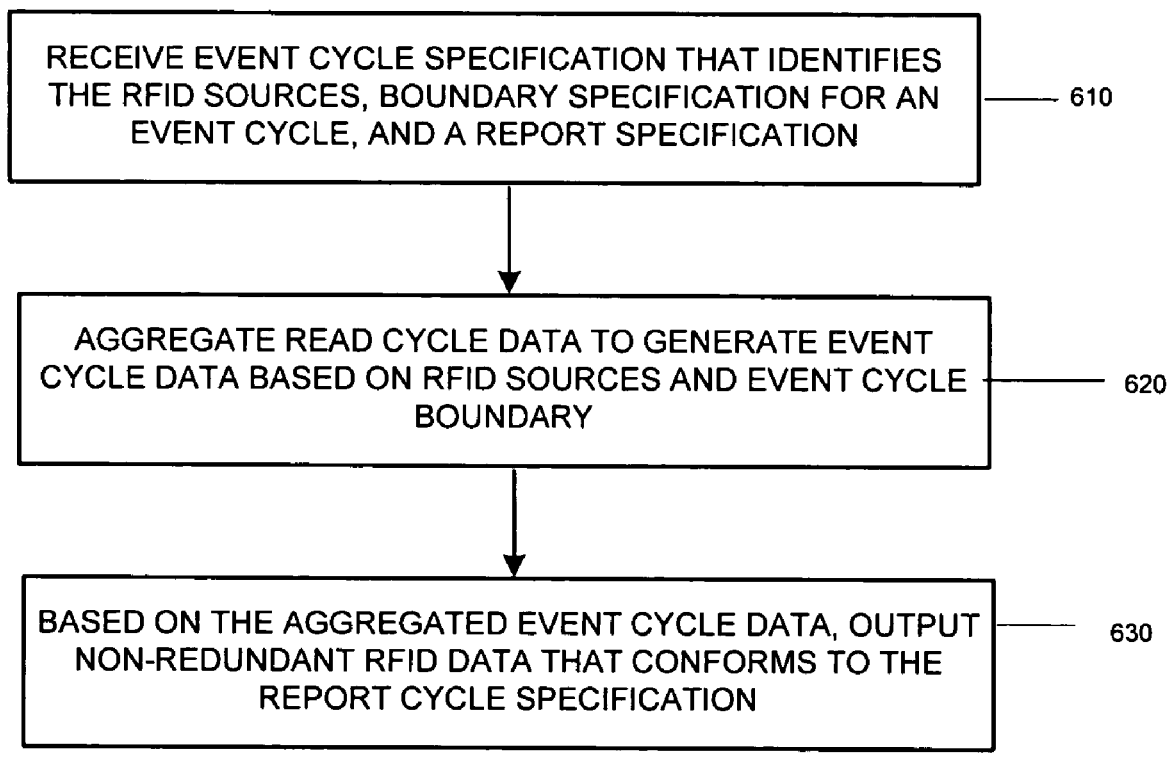
FIG. 6 is a flow chart of a process for providing non-redundant RFID data to an application program.

FIG. 6 illustrates a process for providing non-redundant RFID data to an application program. The process 600 may be executed by a processor of a RFID processing system and may be an implementation of the process 160 of FIG. 1 to aggregate read cycle data and the process 170 of FIG. 1 to provide outputs to applications.

The process 600 begins when the processor executing the process 600 receives an event cycle specification that identifies RFID sources and a boundary specification for an event cycle (step 610). Read cycle data from the RFID sources is used to aggregate event cycle data. As described previously, read cycle data may be aggregated from multiple RFID sources of different types. Examples of RFID sources include physical RFID readers, antennas associated with one physical RFID reader or with multiple physical RFID readers, and logical RFID readers that associate one or more physical RFID readers and/or one or more antennas. The boundary specification may be a boundary specification of various types, as described previously with respect to FIG. 4.

The processor also receives a report specification as part of the event cycle specification. The report specification may be a report specification of various types, as described previously with respect to FIG. 4.

The processor aggregates read cycle data to generate event cycle data based on the RFID sources and event cycle boundary specified in the event cycle specification (step 620).

The processor then outputs non-redundant RFID data that conforms to the event cycle specification (step 630). More particularly, the non-redundant RFID data provided to the application conforms to the report specification of the event cycle specification as applied to the event cycle data aggregated based on the RFID sources and boundary specification of the event cycle specification.

The techniques and concepts described herein may be used to aggregate RFID data from readers and supply aggregated RFID data to applications in a variety of contexts. In one example, an RFID application interface may be used for shipment and receipt verification. An application may request the number of logistic units (such as pallets or cases) moving through a portal and totaled by manufacturer and product code across all serial numbers. In this example, objects that are not pallets or cases are filtered out of the result.

In a retail management context, an application may request the number of items that were added to, or removed from, a particular shelf since the last read cycle, totaled by item GTIN across all serial numbers. In this example, objects that are not items for sale are filtered out of the result. Also, the total number of items on a particular shelf during the current read cycle are filtered out of the result.

In a retail checkout application, an application may request the full EPC of items that move through the checkout zone. Types of objects that are not items for sale should be filtered out of the result.

An application that provides retail front door theft detection may request the full EPC of any item that passes through a security point portal at a retail front door and that has not been marked as sold by the store. In addition, some applications may request reports based on other theft detection criteria, such as item value. Similarly, in an application concerning retail shelf theft detection, an application may request the number of items that were removed from the shelf since the last read cycle, totaled by manufacturer and product code across all serial numbers. Object types that are not items are filtered out of the result.

In a warehouse management context, an application may request the EPC of a slot location into which a forklift operator has placed a pallet of products. In this example, objects that are not "slots" are filtered out of the result.

Returning to the example implementation in which report parameters are a result set, a filter, and a report type, the application requests are displayed below in Table 1 for each of the examples described previously.

TABLE 1

| Use Case | Event Cycle Boundaries | Report Settings | | |
|---|---|---|---|---|
| | | Result Set R | Filter F(R) | Report Type |
| 1 (ship/rcpt) | Triggered by pallet entering and leaving portal | Complete | Pallet & Case | Group cardinality, G = pallet/case GTIN |
| 2a (retail OOS) | Periodic | Additions & Deletions | Item | Group cardinality, G = item GTIN |
| 2b (retail OOS) | Periodic | Complete | Item | Group cardinality, G = item GTIN |
| 3 (retail ckout) | Single | Complete | Item | Membership (EPC) |
| 4 (door theft) | Triggered by object(s) entering and leaving portal | Complete | None | Membership (EPC) |

TABLE 1-continued

| Use Case | Event Cycle Boundaries | Result Set R | Filter F(R) | Report Type |
|---|---|---|---|---|
| 5 (shelf theft) | Periodic | Deletions | Item | Group cardinality, G = item GTIN |
| 6 (forklift) | Single | Complete | Slot | Membership (EPC) |

The techniques described above can be implemented in digital electronic circuitry, or in computer hardware, firmware, software, or in combinations of them. The techniques can be implemented as a computer program product (i.e., a computer program tangibly embodied in an information carrier, such as a machine-readable storage device, or in a propagated signal, for execution by, or to control the operation of, data processing apparatus, such as a programmable processor, a computer, or multiple computers). A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Steps of the techniques can be performed by one or more programmable processors executing a computer program to perform functions of the techniques by operating on input data and generating output. Steps can also be performed by, and apparatus can be implemented as, special purpose logic circuitry such as a an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data such as magnetic disks, magneto-optical disks, or optical disks. Information carriers suitable for embodying computer program instructions and data include all forms of non-volatile memory, including by way of example semiconductor memory devices such as EPROM, EEPROM, and flash memory devices; magnetic disks such as internal hard disks or removable disks; magneto-optical disks; and CD-ROM and DVD-ROM disks. The processor and the memory can be supplemented by, or incorporated in, special purpose logic circuitry.

Other implementations are within the scope of the following claims.

What is claimed is:

1. A non-transitory computer-readable medium having embodied thereon a computer program for providing an interface to Radio Frequency Identification ("RFID") data, the medium comprising one or more code segments configured to provide RFID data in response to an event cycle specification received from an application program that is configured to receive the RFID data from the interface, wherein the interface is configured to:

receive the event cycle specification from the application program that identifies one or more RFID sources, wherein the event cycle specification comprises a boundary specification defining a boundary for an event cycle and a report specification defining a requested output of non-redundant RFID data, wherein an event cycle comprises an aggregation of one or more read cycles of RFID data from one or more RFID readers, wherein the aggregation comprises a non-redundant list of unique identifiers of the RFID sources;

in response to receiving the event cycle specification from the application program, provide an output of RFID data conforming to the event cycle specification to the application program, wherein the output is based on the report specification, and wherein the report specification comprises at least one of a set to report, an optional filter to apply, and a type of information to report, wherein the boundary specification comprises an indication of a stop-trigger event to end an event cycle, wherein the boundary specification comprises a stable-field interval time value that defines an interval of time used to end an event cycle when no new RFID tag identities are read within the interval of time and a duration time value that defines an interval of time used to determine when an event cycle ends based on passage of the interval of time since the start of the event cycle, and the interface is further configured to end an event cycle based on the first occurrence of detection of a stop-trigger event, passage of the duration time value, or passage of the stable-field interval of time value.

2. The computer-readable medium of claim 1 wherein the interface is further configured to:

receive, from a second application program, a second event cycle specification that identifies one or more RFID sources, a boundary specification defining a boundary for an event cycle, and a report specification defining a requested output of non-redundant RFID data, and in response to receiving the second event cycle specification, provide a second output of non-redundant RFID data conforming to the second event cycle specification.

3. The computer-readable medium of claim 2 wherein the one or more RFID sources of the event cycle specification and the one or more RFID sources of the second event cycle specification each include at least one RFID source that is the same.

4. The computer-readable medium of claim 2 wherein the one or more RFID sources of the event cycle specification are the same as the one or more RFID sources of the second event cycle specification.

5. The computer-readable medium of claim 2 wherein the one or more RFID sources of the event cycle specification and the one or more RFID sources of the second event cycle specification do not include any of the same RFID sources.

6. The computer-readable medium of claim 2 wherein the event cycle specification and second event cycle specification are received substantially concurrently.

7. The computer-readable medium of claim 2 wherein the output of non-redundant RFID data conforming to the event cycle specification and the second output of non-redundant RFID data conforming to the second event cycle specification are produced substantially concurrently.

8. The computer-readable medium of claim 2 wherein the event cycle specification is received substantially concurrently with the provision of a second output of non-redundant RFID data conforming to the second event cycle specification.

9. The computer-readable medium of claim 1 wherein a RFID source comprises one or more RFID physical readers.

10. The computer-readable medium of claim 1 wherein a RFID source comprises one or more antennas, each antenna being associated with a physical RFID reader.

11. The computer-readable medium of claim 1 wherein a RFID source comprises a logical reader that is associated with one or more RFID physical readers.

12. The computer-readable medium of claim 1 wherein a RFID source comprises a logical reader that is associated with one or more antennas, each antenna being associated with a physical RFID reader.

13. The computer-readable medium of claim 1 wherein the event cycle specification comprises a read cycle specification that defines a rate of a read cycle performed by each of the RFID readers identified in the event cycle specification.

14. The computer-readable medium of claim 13 wherein the rate of the read cycle comprises a time value that defines time between a start of one read cycle and a start of a next read cycle in a series of read cycles.

15. The computer-readable medium of claim 14 wherein the read cycle specification comprises a Boolean value that identifies whether the time value or a previously configured rate of a read cycle is used to define the rate of the read cycle performed by each of the RFID readers identified in the event cycle specification.

16. The computer-readable medium of claim 1 wherein the boundary specification comprises an indication of a trigger event to initiate a start of an event cycle.

17. The computer-readable medium of claim 16 wherein the indication of the trigger event comprises a uniform resource identifier.

18. The computer-readable medium of claim 1 wherein the boundary specification comprises a repetition time value that defines an interval of time used to initiate a subsequent event cycle based on passage of the interval of time since the start of a previous event cycle.

19. The computer-readable medium of claim 1 wherein the duration time value comprises a duration time value expressed in an amount of time.

20. The computer-readable medium of claim 19 wherein the amount of time comprises milliseconds.

21. The computer-readable medium of claim 1 wherein the duration time value comprises a predetermined number of read cycles.

22. The computer-readable medium of claim 1 wherein the stable-field interval time value comprises a duration time value expressed in an amount of time.

23. The computer-readable medium of claim 22 wherein the amount of time comprises 15 milliseconds.

24. The computer-readable medium of claim 1 wherein the stable-field interval time value comprises a predetermined number of read cycles.

25. The computer-readable medium of claim 1 wherein the indication of the stop-trigger event comprises a uniform resource identifier.

26. The computer-readable medium of claim 1 wherein the interface is further configured to receive a name used to reference the event cycle specification.

27. The computer-readable medium of claim 26 wherein the interface is further configured to:
receive a request from the application program that identifies a particular event cycle specification name and a destination to which non-redundant RFID data is to be provided, and
provide the output of non-redundant RFID data to the destination based on the particular event cycle specification name received.

28. The computer-readable medium of claim 27 wherein the output is provided on a recurring basis based on the receipt of the request from the application program without receiving subsequent requests from the application program.

29. The computer-readable medium of claim 27 wherein the output is provided in response to receipt of the request.

30. The computer-readable medium of claim 1 wherein the report specification comprises a report set specification that indicates whether the output of non-redundant RFID data is to include all RFID tag identities in the current event cycle, only RFID tag identities added since the previous event cycle, or only RFID tag identities deleted since the previous event cycle.

31. The computer-readable medium of claim 1 wherein the report specification comprises a report set specification that indicates a filter specification that identifies a search criterion to identify RFID tag identities to be processed to produce the output.

32. The computer-readable medium of claim 31 wherein the filter specification comprises a RFID tag identity pattern that defines a numeric range of RFID tag identities.

33. The computer-readable medium of claim 31 wherein the filter specification identifies one or both of RFID tag identities that are to be included in the output and RFID tag identities that are to be excluded from the output.

34. The computer-readable medium of claim 1 wherein the report specification comprises a report type specification that indicates whether the output is to include a list of RFID tag identities, a count of RFID tag identities, a group membership report that identifies RFID tag identities that are included in a particular group of RFID tag identities, or a group cardinality report that provides a count of a number of RFID identities that are included in a particular group of RFID tag identities.

35. The computer-readable medium of claim 1 wherein the report specification comprises a Boolean value that indicates whether an indication is to be provided to the application program when no RFID identities conform to the report specification.

36. The computer-readable medium of claim 1 wherein the event cycle specification identifies a second report specification defining a requested output of non-redundant RFID data.

37. The computer-readable medium of claim 1 wherein the access control information comprises information identifying permitted access to RFID data by specifying search criteria to identify RFID data that are permitted to be accessed.

38. The computer-readable medium of claim 37 wherein the search criteria comprise a RFID tag identity pattern that defines a numeric range of RFID tag identities.

39. The computer-readable medium of claim 1 wherein providing the output of non-redundant RFID data comprises providing an event cycle report having a header identifying the event cycle and a report body having an output of non-redundant RFID data.

40. The computer-readable medium of claim 39 wherein the header comprises an integer denoting the length of the time from the beginning of the event cycle to the end of the event cycle, an integer denoting the number of read cycles completed during the event cycle, a termination condition that indicates a condition that caused the event cycle to end, and the RFID sources from which read cycle data was aggregated to produce event cycle data of the event cycle.

41. The computer-readable medium of claim 39 wherein the report body comprises an integer denoting the number of RFID tag identities aggregated during the event cycle.

42. The computer-readable medium of claim 39 wherein the report body comprises a list of RFID tag identities aggregated during the event cycle.

43. The computer-readable medium of claim 39 wherein the report body comprises a group cardinality report body that includes a list of pairs with each pair including a group name and an integer denoting the number of RFID tag identities that are included in a group identified by the group name.

44. The computer-readable medium of claim 39 wherein the report body comprises a group membership report body that includes a list of pairs with each pair including a group name and a list of RFID tag identities that are included in a group identified by the group name.

45. A system for providing an interface to Radio Frequency Identification ("RFID") data, the system comprising a processor connected to a storage device, one or more input/output devices, and an information carrier having instructions for generating the interface to RFID data, wherein the processor is operable to execute the instructions that are configured to:
receive an event cycle specification from an application program that identifies one or more RFID sources, and that is configured to receive the RFID data from the interface, wherein the event cycle specification comprises a boundary specification defining a boundary for an event cycle and a report specification defining a requested output of non-redundant RFID data, wherein an event cycle comprises an aggregation of one or more read cycles of RFID data from one or more RFID readers, wherein the aggregation comprises a non-redundant list of unique identifiers of the RFID sources; and
in response to receiving the event cycle specification from the application program, provide an output of RFID data conforming to the event cycle specification to the application program, wherein the output is based on the report specification, and wherein the report specification comprises at least one of a set to report, an optional filter to apply, and a type of information to report,
wherein the boundary specification comprises an indication of a stop-trigger event to end an event cycle,
wherein the boundary specification comprises a stable-field interval time value that defines an interval of time used to end an event cycle when no new RFID tag identities are read within the interval of time and a duration time value that defines an interval of time used to determine when an event cycle ends based on passage of the interval of time since the start of the event cycle, and
the instructions are further configured to end an event cycle based on the first occurrence of detection of a stop-trigger event, passage of the duration time value, or passage of the stable-field interval of time value.

46. The system of claim 45 wherein the instructions for generating the interface are further configured to:
receive, from a second application program, a second event cycle specification that identifies one or more RFID sources, a boundary specification defining a boundary for an event cycle, and a report specification defining a requested output of non-redundant RFID data, and
in response to receiving the second event cycle specification, provide a second output of non-redundant RFID data conforming to the second event cycle specification.

47. The system of claim 45 wherein a RFID source comprises one or more RFID physical readers.

48. The system of claim 45 wherein a RFID source comprises one or more antennas, each antenna being associated with a physical RFID reader.

49. The system of claim 45 wherein a RFID source comprises a logical reader that is associated with one or more RFID physical readers.

50. The system of claim 45 wherein a RFID source comprises a logical reader that is associated with one or more antennas, each antenna being associated with a physical RFID reader.

51. The system of claim 45 wherein the event cycle specification comprises a read cycle specification that defines a rate of a read cycle performed by each of the RFID readers identified in the event cycle specification.

52. The system of claim 45 wherein the report specification comprises a report set specification that indicates whether the output of non-redundant RFID data is to include all RFID tag identities in the current event cycle, only RFID tag identities added since the previous event cycle, or only RFID tag identities deleted since the previous event cycle.

53. The system of claim 45 wherein the report specification comprises a report set specification that indicates a filter specification that identifies a search criterion to identify RFID tag identities to be processed to produce the output.

54. The system of claim 45 wherein the report specification comprises a report type specification that indicates whether the output is to include a list of RFID tag identities, a count of RFID tag identities, a group membership report that identifies RFID tag identities that are included in a particular group of RFID tag identities, or a group cardinality report that provides a count of a number of RFID identities that are included in a particular group of RFID tag identities.

55. The system of claim 45 wherein providing the output of non-redundant RFID data comprises providing an event cycle report having a header identifying the event cycle and a report body having an output of non-redundant RFID data.

56. A method for providing an interface to Radio Frequency Identification ("RFID") data, the method comprising:
receiving, from an application program that is configured to receive the RFID data from the interface, an event cycle specification that identifies one or more RFID sources, wherein the event cycle specification comprises a boundary specification defining a boundary for an event cycle and a report specification defining a requested output of non-redundant RFID data, wherein an event cycle comprises an aggregation of one or more read cycles of RFID data from one or more RFID readers, wherein the aggregation comprises a non-redundant list of unique identifiers of the RFID sources; and
in response to receiving the event cycle specification from the application program, providing an output of RFID data conforming to the event cycle specification to the application program, wherein the output is based on the report specification, and wherein the report specification comprises at least one of a set to report, an optional filter to apply, and a type of information to report,
wherein the boundary specification comprises an indication of a stop-trigger event to end an event cycle,
wherein the boundary specification comprises a stable-field interval time value that defines an interval of time used to end an event cycle when no new RFID tag identities are read within the interval of time and a duration time value that defines an interval of time used to determine when an event cycle ends based on passage of the interval of time since the start of the event cycle; and ending an event cycle based on the first occurrence of detection of a stop-trigger event, passage of the duration time value, or passage of the stable-field interval of time value.

57. The method of claim 56 further comprising:

receiving, from a second application program, a second event cycle specification that identifies one or more RFID sources, a boundary specification defining a boundary for an event cycle, and a report specification defining a requested output of non-redundant RFID data, and in response to receiving the second event cycle specification, providing a second output of non-redundant RFID data conforming to the second event cycle specification.

58. The method of claim 56 wherein a RFID source comprises one or more RFID physical readers.

59. The method of claim 56 wherein a RFID source comprises one or more antennas, each antenna being associated with a physical RFID reader.

60. The method of claim 56 wherein a RFID source comprises a logical reader that is associated with one or more RFID physical readers.

61. The method of claim 56 wherein a RFID source comprises a logical reader that is associated with one or more antennas, each antenna being associated with a physical RFID reader.

62. The method of claim 56 wherein the event cycle specification comprises a read cycle specification that defines a rate of a read cycle performed by each of the RFID readers identified in the event cycle specification.

63. The method of claim 56 wherein the report specification comprises a report set specification that indicates whether the output of non-redundant RFID data is to include all RFID tag identities in the current event cycle, only RFID tag identities added since the previous event cycle, or only RFID tag identities deleted since the previous event cycle.

64. The method of claim 56 wherein the report specification comprises a report set specification that indicates a filter specification that identifies a search criterion to identify RFID tag identities to be processed to produce the output.

65. The method of claim 56 wherein the report specification comprises a report type specification that indicates whether the output is to include a list of RFID tag identities, a count of RFID tag identities, a group membership report that identifies RFID tag identities that are included in a particular group of RFID tag identities, or a group cardinality report that provides a count of a number of RFID identities that are included in a particular group of RFID tag identities.

66. The method of claim 56 wherein providing the output of non-redundant RFID data comprises providing an event cycle report having a header identifying the event cycle and a report body having an output of non-redundant RFID data.

* * * * *

UNITED STATES PATENT AND TRADEMARK OFFICE
CERTIFICATE OF CORRECTION

| | | |
|---|---|---|
| PATENT NO. | : 7,814,497 B2 | Page 1 of 1 |
| APPLICATION NO. | : 10/883850 | |
| DATED | : October 12, 2010 | |
| INVENTOR(S) | : Kenneth R. Traub et al. | |

It is certified that error appears in the above-identified patent and that said Letters Patent is hereby corrected as shown below:

In column 17, line 34, after "as" delete "a".

Signed and Sealed this
Thirty-first Day of May, 2011

David J. Kappos
*Director of the United States Patent and Trademark Office*